United States Patent [19]

Kameyama

[11] Patent Number: 5,721,961

[45] Date of Patent: Feb. 24, 1998

[54] LENS-FITTED PHOTO FILM UNIT

[75] Inventor: Nobuyuki Kameyama, Kanagawa, Japan

[73] Assignee: Fuji Photo Film Co., Ltd., Kanagawa, Japan

[21] Appl. No.: 713,858

[22] Filed: Sep. 13, 1996

[30] Foreign Application Priority Data

Sep. 22, 1995 [JP] Japan ................................. 7-244771

[51] Int. Cl.$^6$ .................................................. G03B 17/02
[52] U.S. Cl. ................................................................ 396/6
[58] Field of Search ...................................... 396/6

[56] References Cited

U.S. PATENT DOCUMENTS

| 5,435,500 | 7/1995 | Shibata | 396/6 |
| 5,537,176 | 7/1996 | Hara et al. | 396/6 |

*Primary Examiner*—David M. Gray
*Attorney, Agent, or Firm*—Young & Thompson

[57] ABSTRACT

A lens-fitted photo film unit contains a roll of photo film whose base layer is formed from annealed polyethylene naphthalate. The A-PEN base photo film has the same stiffness at a smaller thickness compared with the conventional TAC base photo film. The roll of photo film of the smaller thickness may have a smaller external diameter in a film roll chamber of the film unit than the conventional photo film having the same number of available exposure frames. Accordingly, the internal diameter of the film roll chamber and thus the thickness and the width of the unit body can be minimized.

3 Claims, 5 Drawing Sheets

LENS-FITTED PHOTO FILM UNIT

BACKGROUND OF THE INVENTION

1. Field of the Invention

The present invention relates to a lens-fitted photo film unit containing a cassette shell and a roll of unexposed photo film unit in a cassette chamber and a film roll chamber, respectively, such that the photo film is wound up into the cassette shell one frame after each exposure, and more particularly to a minimized lens-fitted photo film unit.

2. Background Arts

Single-use lens-fitted photo film units, hereinafter called simply film units, have been widely known, each of which is preloaded with a cassette shell and a roll of unexposed photo film. The film unit has a compact body and a simple photographic mechanism so that anyone can enjoy photography with ease wherever and whenever they want. Considering the nature of the film unit, it has been desirable to make the film unit as small and compact as comparable to a money card or a cigarette package.

In a unit body 2 of a conventional film unit, as shown in FIG. 5, a cassette chamber 4 holding a cassette shell 3 and a film roll chamber 6 holding a roll of unexposed photo film 5 are disposed on opposite horizontal sides of an optical path 7 of a photographic lens, i.e., on opposite sides of an exposure chamber 9. The photo film 5 is secured at an end to a spool 3a of the cassette shell 3 to wind up the photo film 3 into the cassette shell 3 frame by frame.

Accordingly, the sizes of these chambers 4, 6 and 9 limits the size of the unit body 2 as a whole. To minimize the unit body 2, it is necessary to minimize these chambers 4, 6 and 9. Since the conventional film unit contains a photo film cassette of ISO-135 size, the size of the chambers 4, 6 and 9 have been adjusted to ISO-135 size. Concretely, the size of the exposure chamber 9 is defined by a predetermined full size exposure frame of 35 mm photo film that is contained in the ISO-135 size photo film cassette. And the internal diameter $D_T$ of the cassette chamber 4 is defined by the external diameter of the cassette shell 3 that is standardized according to ISO 1007-1979.

Also, the internal diameter $d_T$ of the film roll chamber 6 is determined to be large enough to prevent the roll of photo film 5 from curling too strong for smooth advancement even if the entire length of the photo film 5 is held in the film roll chamber 6 for a certain time at a expected high temperature. On the other hand, the photo film 5 of ISO-135 size conventionally uses triacetyl-cellulose (TAC) as its base material, and has a thickness of about 140 µm inclusive of emulsion layers. This thickness is necessary for the TAC base photo film 5 to obtain sufficient stiffness.

Consequently, the thickness of the conventional unit body 2 at a peak or most protruding front portion of the cassette chamber 4 cannot be less than a value $T_T$ that is defined by the internal diameter $D_T$ of the cassette chamber 4. Because the internal diameter $d_T$ of the film roll chamber 6 can be smaller than the external diameter of the cassette shell 25 and thus the internal diameter $D_T$ of the cassette chamber 4, as is shown in FIG. 5, it is possible to reduce the thickness of the unit body 2 in the other portion to a smaller value $t_T$ than the value $T_T$, as shown in FIG. 5. However, the value $t_T$ is also limited by the internal diameter $d_T$ of the film roll chamber 6. In the same way, the width or horizontal length of the unit body 2 cannot be less than a value $W_t$ that is defined by the horizontal length of the exposure chamber 9 and the internal diameters $D_T$ and $d_T$ of the chambers 4 and 6. For more reduction of the thickness and the width of the unit body 2, it is necessary to reduce the number of available exposures or the size of exposure frame.

SUMMARY OF THE INVENTION

In view of the foregoing, a prime object of the present invention is to make a film unit have smaller thickness and width than a conventional film unit, without the need for changing the number of available exposures or the exposure frame size.

The object of the invention is achieved by forming a base layer of photo film from annealed polyethylene naphthalate (A-PEN) to have a reduced thickness. Because the A-PEN base layer of 70 µm to 100 µm may have the same stiffness as the TAC base layer of 120 µm or so, it is possible to reduce the total thickness of the A-PEN base photo film while maintaining the same stiffness level as the TAC base photo film. In correspondence with the reduced thickness, the external diameter of the photo film roll may be reduced in order to keep the A-PEN base photo film in permissible curling conditions, compared with the TAC base photo film. Accordingly, the film roll chamber may have a smaller internal diameter than conventional.

BRIEF DESCRIPTION OF THE DRAWINGS

The above and other objects and advantages of the present invention will become apparent from the following detailed description of the The above and other objects and advantages of the present invention will become apparent from the following detailed description of the preferred embodiments when read with reference to the accompanying drawings, which are given by way of illustration only and thus are not limiting the present invention, wherein like reference numerals designate like or corresponding parts throughout the several views, and wherein.

DETAILED DESCRIPTION OF THE PREFERRED EMBODIMENT

Figure 1:
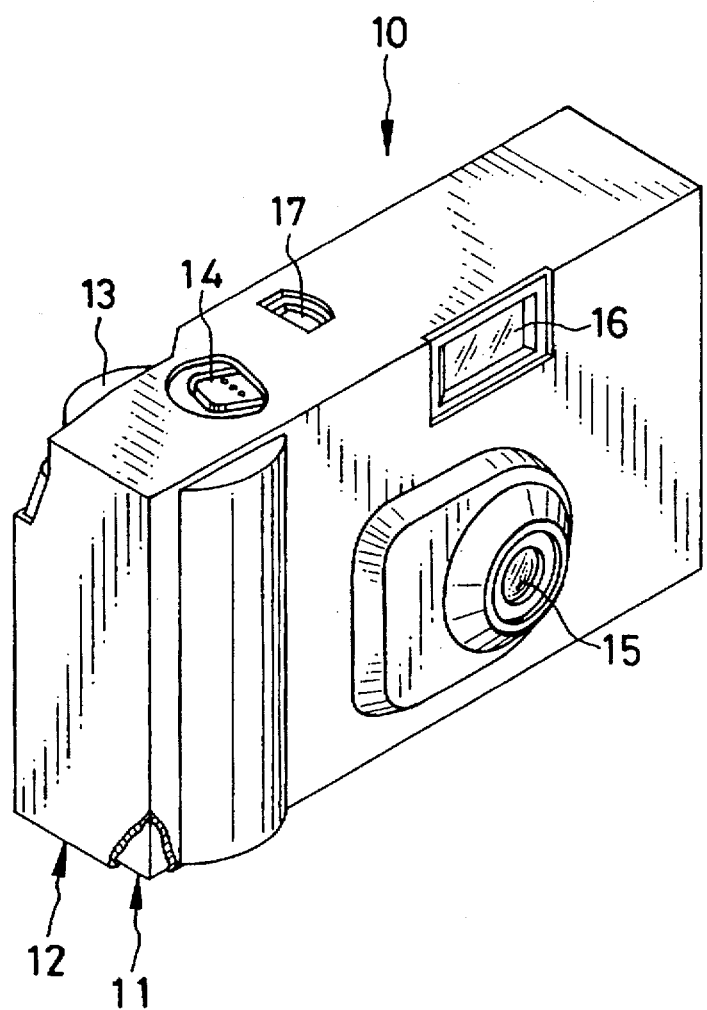
FIG. 1 is a perspective view of a film unit according to a preferred embodiment of the present invention.

FIG. 1 shows an outer appearance of a film unit 10 according to an embodiment of the invention. The film unit 10 consists of a unit body 11 and an outer case 12. The outer case 12 is made of cardboard to wrap the unit body 11 while exposing photographic elements of the unit body 11, such as a film winding wheel 13, a shutter button 14, a taking lens 15, a viewfinder 16 and a frame counter window 17, to the outside.

Figure 2:
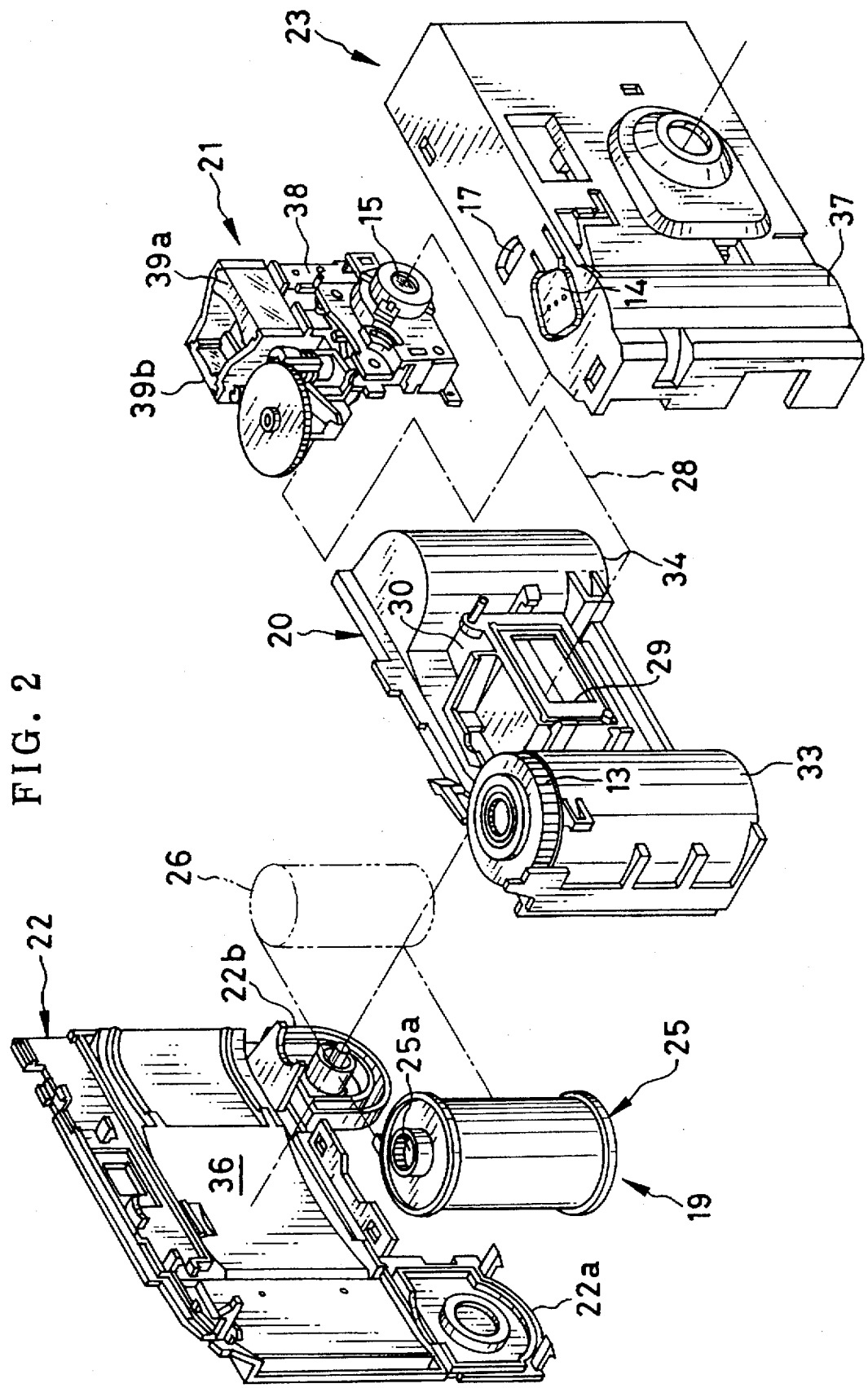
FIG. 2 is an exploded perspective view of a unit body of the film unit shown in FIG. 1.

As shown in FIG. 2, the unit body 11 is constituted of a main section 20 for holding a photo film cassette 19, a photo-taking unit 21 attached to a front of the main section 20, a rear cover 22 for closing the rear side of the main section 20 in a light-tight fashion, and a front cover 23 attached to the front of the main section 20 to cover the photo-taking unit 21. The main section, the rear cover 22 and the front cover 23 are formed from opaque plastic.

The photo film cassette 19 is constituted of a cassette shell 25 and a roll of photo film 26. The photo film 26 is previously drawn out from the cassette shell 25 and wound in the roll. The size of the cassette shell 25 is equal to that of ISO-135 size, and the size of the photo film 26 is equal to that of 35 mm photo film. However, the photo film 26 uses annealed polyethylene naphthalate (A-PEN) as its base material. A-PEN is produced by annealing a film of polymer base material such as polyester film at a temperature of not less than 40° C. but less than the glass transition temperature of that polymer base material.

Because the A-PEN base layer of 70 μm to 100 μm may have the same stiffness as the TAC base layer of 120 μm or so, it is possible to reduce the thickness of the photo film 26, compared with the conventional TAC base photo film.

Figure 3:
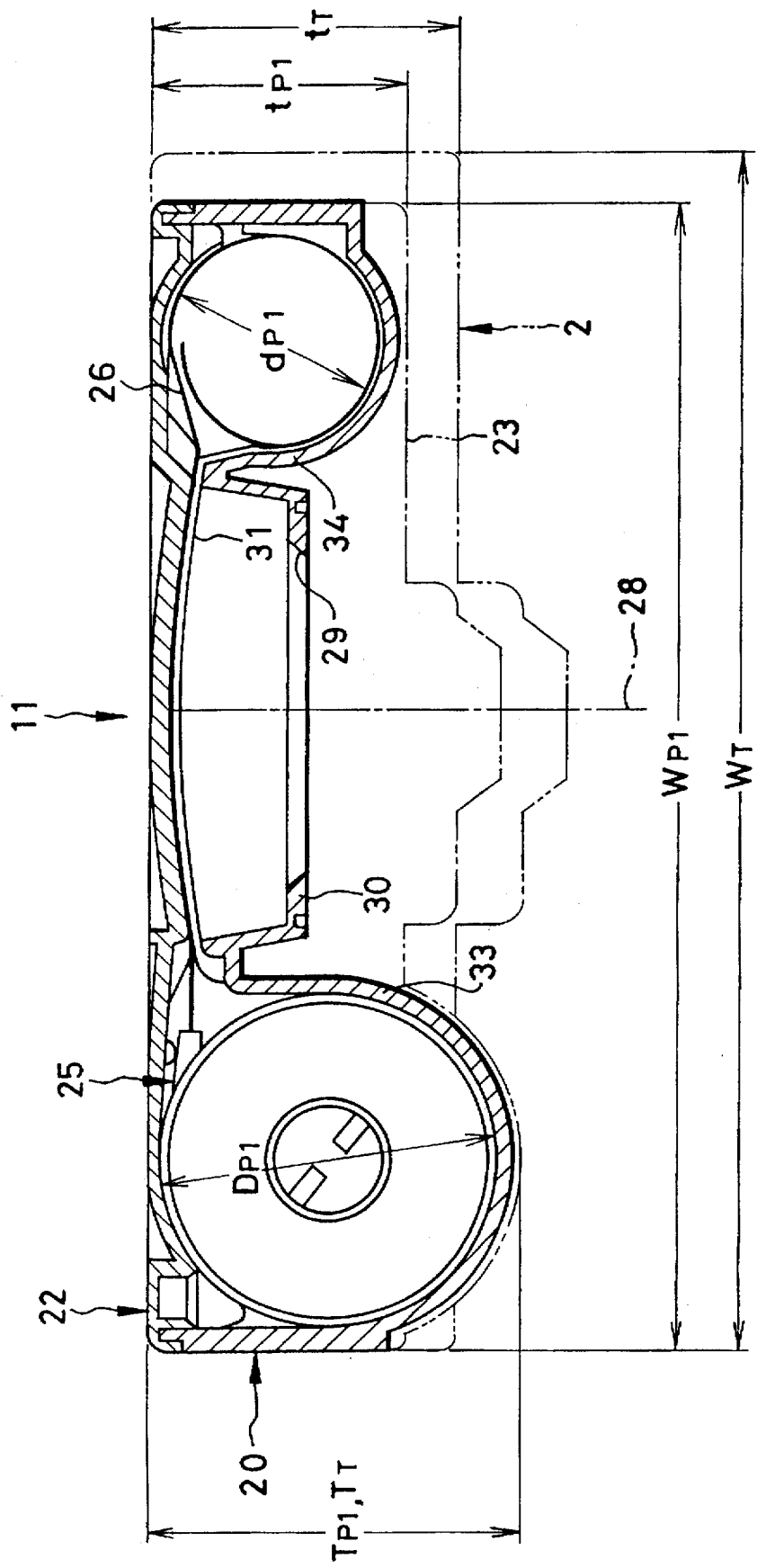
FIG. 3 is an explanatory view of the unit body.

As shown in FIG. 3, the main section 20 is provided with an exposure chamber 30 having front and rear exposure apertures 29 and 31 on an optical path 28 of the taking lens 15, to define the size of one exposure area or frame to be formed on the photo film 26. On opposite horizontal sides of the exposure chamber 30, a cassette chamber 33 and a film roll chamber 34 are disposed to hold the cassette shell 25 and the roll of photo film 26, respectively. The film winding wheel 13 is mounted on the cassette chamber 33 and engages a spool 25a of the cassette shell 25, to rotate the spool 25a to rewind the photo film 26 back into the cassette shell 25 one frame after each exposure.

As shown in FIG. 2, the rear cover 22 has a film supporting surface 36 to guide and support the photo film 26 from the rear side. Bottom lids 22a and 22b for closing open bottoms of the cassette chamber 33 and the film roll chamber 34 are formed integrally with the rear cover 22. When the exposed photo film 26 is entirely wound up into the cassette shell 25, the bottom lid 22a is opened to remove the cassette shell 25.

The front cover 23 has the shutter button 14, the frame counter window 17 and so forth as integral parts. The front cover 23 also has a semi-cylindrical protuberant portion 37 in front of the cassette chamber 33 to serve as a grip on photographing. The protuberant portion 37 fits over a front wall of the cassette chamber 33, as shown in FIG. 3, so that the thickness or depth is reduced in the other portion of the unit body 2.

The photo-taking unit 21 is an assembly having photo-taking mechanisms such as a film winding mechanism, a frame counting mechanism and a shutter mechanism mounted on a base portion 38. The taking lens 15 is mounted to a front of the base portion 38. Also, lens elements 39a and 39b for the viewfinder 16 are mounted on a top side of the base portion 38. The photo-taking unit 20 is removably attached to the front of the exposure chamber 30.

Since the cassette shell 25 has the same size as that of the conventionally used ISO-135 size photo film cassette, the cassette chamber 33 has the same internal diameter $Dp1=DT$ as the cassette chamber 4 of the conventional unit body 2. Accordingly, the thickness $Tp1$ of the unit body 11 at the peak of the protuberant portion or grip 37 is equal to the thickness $TT$ of the conventional unit body 2.

On the other hand, the film roll chamber 34 has a smaller internal diameter $dp1$ than the film roll chamber 6 of the conventional unit body 2. As described above, the internal diameter $dp1$ of the film roll chamber 34 is determined to be large enough to prevent the roll of photo film 26 from curling so strong that the photo film 26 cannot be smoothly advanced. Because the A-PEN base photo film 26 has the same stiffness at a smaller thickness compared with the conventional TAC base photo film 5, the roll of photo film 26 may have a smaller external diameter in the film roll chamber 34 than the conventional photo film 5. Accordingly, the film roll chamber 34 has a smaller internal diameter $dp1$ than the film roll chamber 6 of the conventional unit body 2. Thus, the thickness $tp1$ of the unit body 11 at the peak of the film roll chamber 34 can be smaller than the thickness $tT$ of the corresponding portion of the conventional unit body 2 by the difference between the internal diameters $dp1$ and $dT$ of the film roll chamber 26 and the conventional film roll chamber 6. Also, the width $Wp1$ of the unit body 11 can be smaller than the width $WT$ of the unit body 2 by the difference "$dT-dp1$", while maintaining the size of the exposure chamber 30 of the conventional exposure chamber 9.

Figure 4:
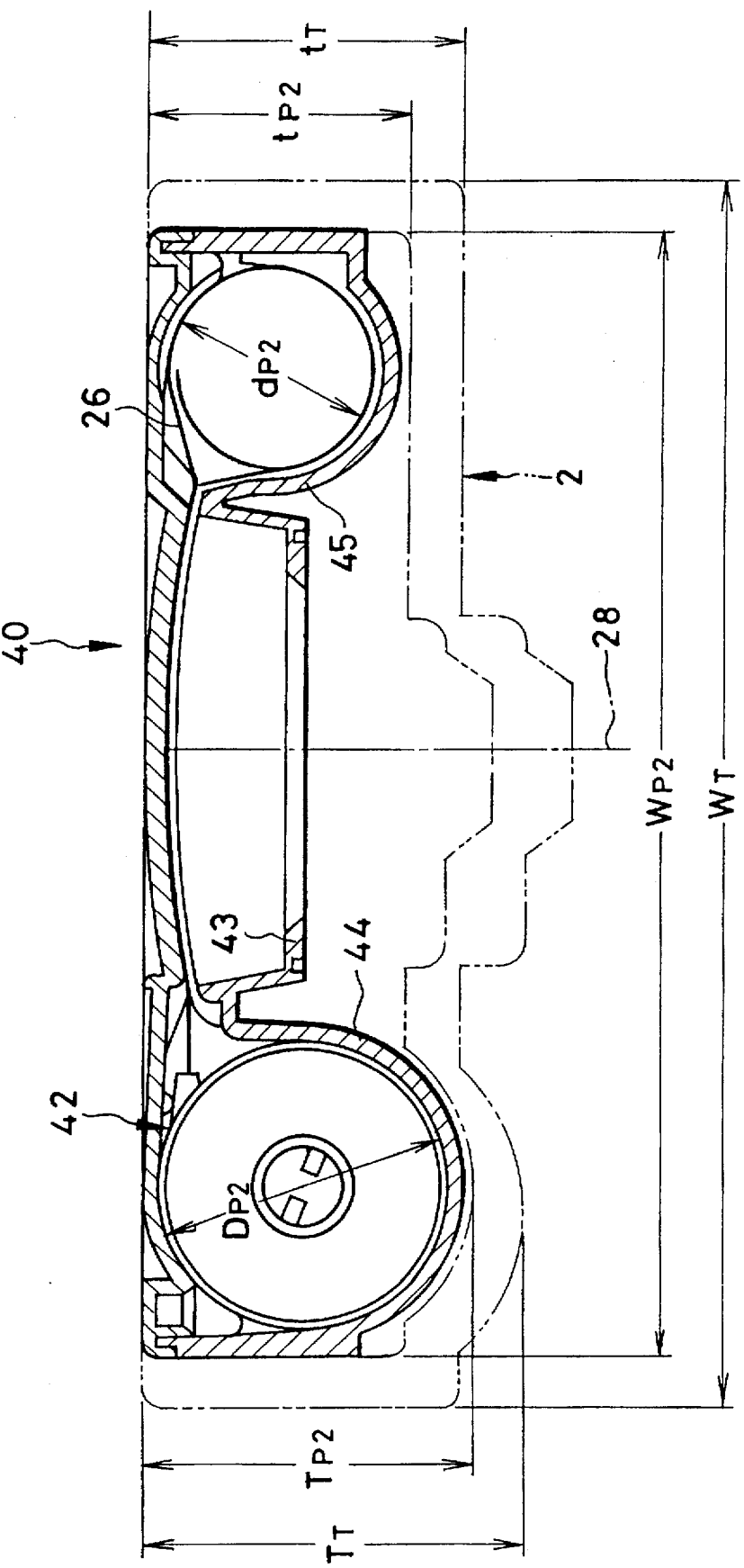
FIG. 4 is an explanatory view of a unit body according to another preferred embodiment of the present invention.
Figure 5:
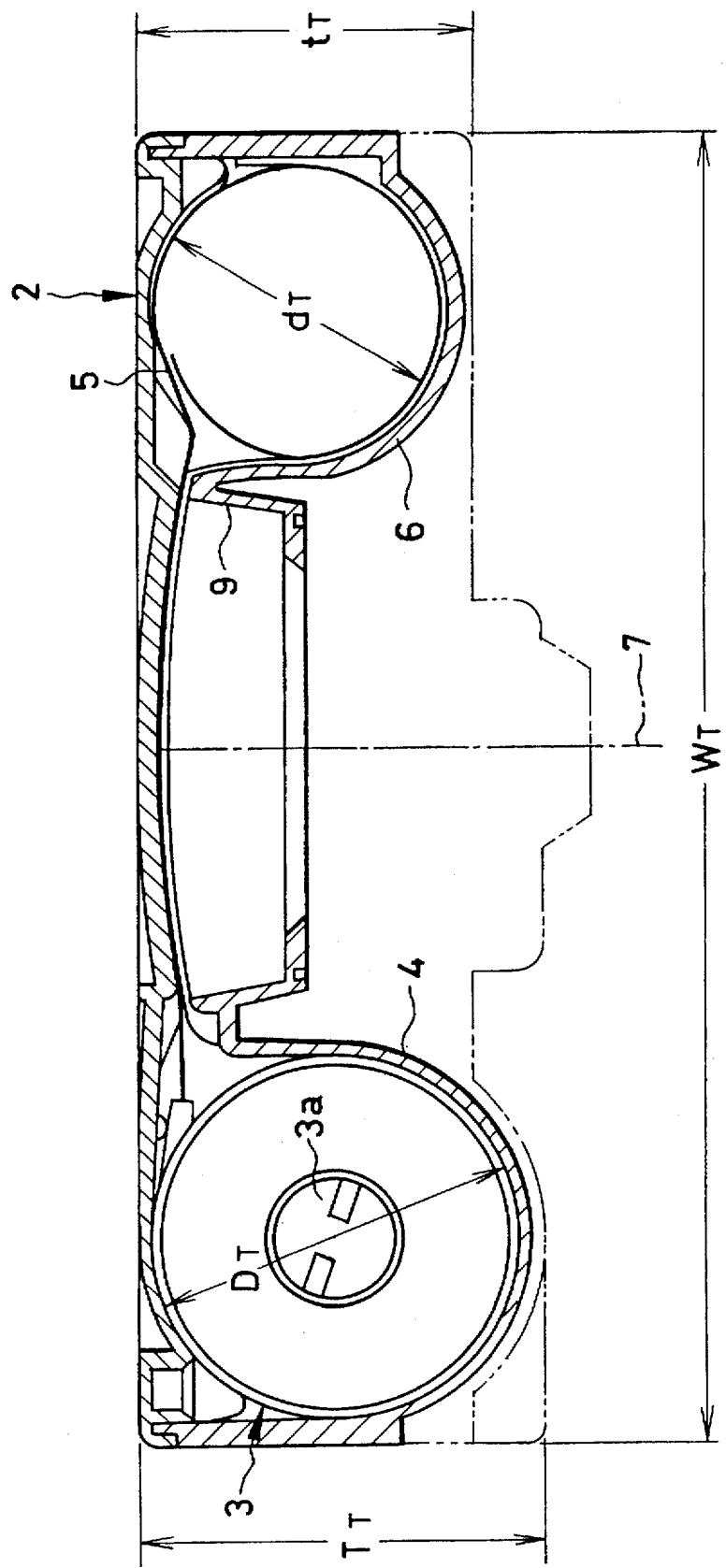
FIG. 5 is an explanatory view of a unit body of a conventional film unit.

FIG. 4 shows a unit body 40 according to another embodiment of the invention, wherein a cassette chamber 44 as well as a film roll chamber 45 is reduced in diameter to make the unit body 40 still more compact and small. This is achieved by using a cassette shell 42 having a smaller external diameter $Dp2$ than that $DT$ of the cassette shell 25 of ISO-135 size. The value $Dp2$ may be defined by the thickness of the A-PEN base photo film 26 and the curling conditions thereof, in the same way as for the internal diameter $dp2$ of the film roll chamber 45. The value $dp2$ may be equal to the internal diameter $dp1$ of the film roll chamber 34 of the first embodiment.

According to the embodiment shown in FIG. 4, the thickness $Tp2$ of the unit body 40 at the peak of the cassette chamber 44 can be smaller than the thickness $TT$ of the corresponding portion of the unit body 2 by the difference between the internal diameters $Dp2$ and $DT$ of the cassette chamber 44 and the conventional cassette chamber 4. Also, the thickness $tp2$ at the peak of the film roll chamber 45 can be smaller than the thickness $tT$ of the corresponding portion of the conventional unit body 2 by the difference between the internal diameters $dp2$ and $dT$ of the film roll chamber 45 and the conventional film roll chamber 6. The width $Wp2$ of the unit body 40 can be smaller than the width $WT$ of the unit body 2 by these differences "$(DT-Dp2)+(dT-dp2)$", while maintaining the size of an exposure chamber 43 unchanged from that of the conventional exposure chamber 9.

As a modification of the present invention, the A-PEN base photo film may have a longer length and thus a greater number of available exposure frames when the ISO-135 size cassette shell is used for accommodating it. Accordingly, it is possible to use the same size cassette chamber and film roll chamber as conventional, while elongating the length of photo film to have a greater number of available exposure frames than the same size conventional film unit. For example, a film unit according to the invention may have 39 exposure frames available in the same size as a conventional film unit having 27 exposure frames available. It is also possible to use the same unit bodies for both 27-exposure film units and 39-exposure film units.

Although the present invention has been described with respect to the film units containing 35 mm photo film, the present invention is equivalently applicable to minimizing those film units containing IX-240 size photo film having a smaller width and a smaller exposure frame size than 35 mm photo film.

The appearance of the film unit of the invention is not to be limited to those shown in the drawings. For example, the front surface of the front cover may be gently convex exclusive of the grip. The grip may have another shape than semi-cylindrical. For example, the grip may have a concave portion on the side of the taking lens. The present invention is applicable to any kind of film units including a film unit with a built-in flash, a panoramic film unit and so forth.

Thus, the present invention should not be limited to the above described embodiments but, on the contrary, various modification may be possible to those skilled in the art without departing from the scope of claims attached hereto.

What is claimed is:

1. In a lens-fitted photo film unit having a taking lens, a film roll chamber and a cassette chamber on opposite horizontal sides of said taking lens, said film roll chamber holding a roll of unexposed photo film and having an internal diameter that is defined by a necessary maximum external diameter of the roll of said photo film, said cassette chamber holding a cassette shell and having an internal diameter that is defined by an external diameter of said cassette shell, wherein said photo film is wound into said cassette shell one frame after each exposure, the improvement wherein:

a base layer of said photo film is formed from annealed polyethylene naphthalate, to reduce the thickness of said photo film while maintaining sufficient stiffness;

said internal diameter of said film roll chamber is reduced in correspondence with the reduced thickness of said photo film, while maintaining the number of available exposure frames unchanged; and said external diameter of said cassette shell and thus said internal diameter of said cassette chamber are reduced in correspondence with the reduced thickness of said photo film, while maintaining the number of available exposure frames.

2. A lens-fitted photo film unit as claimed in claim 1, wherein said photo film is 35 mm photo film.

3. A lens-fitted photo film unit as claimed in claim 1, wherein the thickness of said base layer is 70 μm to 100 μm.

* * * * *